(12) United States Patent  (10) Patent No.: US 9,171,391 B2
Smith  (45) Date of Patent: Oct. 27, 2015

(54) SYSTEMS AND METHODS FOR IMAGING A VOLUME-OF-INTEREST

(75) Inventor: Stuart Smith, Englewood, CO (US)

(73) Assignee: Landmark Graphics Corporation, Houston, TX (US)

( * ) Notice: Subject to any disclaimer, the term of this patent is extended or adjusted under 35 U.S.C. 154(b) by 1845 days.

(21) Appl. No.: 11/829,453

(22) Filed: Jul. 27, 2007

(65) Prior Publication Data

US 2009/0027385 A1  Jan. 29, 2009

(51) Int. Cl.
*G06T 19/20* (2011.01)
*G06T 13/20* (2011.01)

(52) U.S. Cl.
CPC ............... *G06T 13/20* (2013.01); *G06T 19/20* (2013.01); *G06T 2210/12* (2013.01); *G06T 2219/2016* (2013.01)

(58) Field of Classification Search
CPC ..... G06T 19/20; G06T 2210/12; G06T 13/20; G06T 2219/2016
USPC .......................... 345/419, 619, 501; 715/782
See application file for complete search history.

(56) References Cited

U.S. PATENT DOCUMENTS

| | | | |
|---|---|---|---|
| 4,359,766 A | 11/1982 | Waters et al. | |
| 5,056,066 A | 10/1991 | Howard | |
| 5,148,494 A | 9/1992 | Keskes | |
| 5,432,751 A | 7/1995 | Hildebrand | |
| 5,458,111 A | 10/1995 | Coin | |
| 5,630,034 A | 5/1997 | Oikawa et al. | |
| 5,734,384 A | 3/1998 | Yanof et al. | |
| 5,781,194 A | 7/1998 | Ponomarev et al. | |
| 5,838,564 A | 11/1998 | Bahorich | |
| 5,839,440 A | 11/1998 | Liou et al. | |
| 5,892,732 A | 4/1999 | Gereztenkom | |
| 5,949,424 A | 9/1999 | Cabral | |
| 5,970,499 A | 10/1999 | Smith et al. | |
| 6,049,759 A | 4/2000 | Etgen | |
| 6,078,869 A | 6/2000 | Gunasekera | |
| 6,396,495 B1 | 5/2002 | Parghi et al. | |
| 6,424,464 B1 | 7/2002 | Neff et al. | |
| 6,473,696 B1 | 10/2002 | Onyia et al. | |
| 6,594,585 B1 | 7/2003 | Gereztenkom | |
| 6,597,358 B2* | 7/2003 | Miller | 715/782 |
| RE38,229 E | 8/2003 | Marfurt et al. | |
| 6,690,820 B2 | 2/2004 | Lees et al. | |
| 6,765,570 B1 | 7/2004 | Cheung et al. | |
| 6,774,914 B1* | 8/2004 | Benayoun | 345/650 |

(Continued)

FOREIGN PATENT DOCUMENTS

| | | | |
|---|---|---|---|
| JP | 6-236440 A | 8/1994 | |
| JP | 7-57118 A | 3/1995 | |

(Continued)

OTHER PUBLICATIONS

Yagel et al., Hardware Assisted Volume Rendering of Unstructured Grids by Incremental Slicing, pp. 1-11, 1996.

(Continued)

*Primary Examiner* — Chante Harrison
(74) *Attorney, Agent, or Firm* — Crain, Caton & James; John Wustenberg

(57) ABSTRACT

Systems and methods for imaging a volume-of-interest, which may include an object or point of interest to be analyzed in a display of three-dimensional data.

30 Claims, 6 Drawing Sheets
(4 of 6 Drawing Sheet(s) Filed in Color)

(56) References Cited

U.S. PATENT DOCUMENTS

| | | | |
|---|---|---|---|
| 6,940,507 | B2 | 9/2005 | Repin et al. |
| 6,987,878 | B2 | 1/2006 | Lees |
| 7,006,085 | B1 | 2/2006 | Acosta et al. |
| 7,013,218 | B2 | 3/2006 | Baker, III et al. |
| 7,076,735 | B2 | 7/2006 | Callegari |
| 7,098,908 | B2 | 8/2006 | Acosta et al. |
| 7,102,647 | B2 | 9/2006 | Sloan et al. |
| 7,170,530 | B2 | 1/2007 | Cui et al. |
| 7,218,331 | B2 | 5/2007 | Huang et al. |
| 7,248,258 | B2 | 7/2007 | Acosta et al. |
| 2002/0172401 | A1 | 11/2002 | Lees et al. |
| 2003/0025692 | A1 | 2/2003 | Lu et al. |
| 2004/0081353 | A1 | 4/2004 | Lees et al. |
| 2004/0174357 | A1 | 9/2004 | Cheung et al. |
| 2005/0116957 | A1* | 6/2005 | Guang .......................... 345/501 |
| 2005/0237334 | A1 | 10/2005 | Chuter |
| 2006/0052690 | A1 | 3/2006 | Sirohey et al. |
| 2006/0125822 | A1* | 6/2006 | Kurtenbach et al. .......... 345/419 |
| 2006/0206562 | A1 | 9/2006 | Callegari |
| 2008/0024512 | A1 | 1/2008 | Chuter |
| 2008/0150937 | A1* | 6/2008 | Lundstrom et al. ........... 345/419 |
| 2008/0165185 | A1 | 7/2008 | Smith et al. |

FOREIGN PATENT DOCUMENTS

| | | |
|---|---|---|
| WO | WO 00/14574 | 3/2000 |
| WO | WO/00/14574 A1 | 3/2000 |
| WO | WO/02/29445 A1 | 4/2002 |

OTHER PUBLICATIONS

Crawfis R.A. et al., A Scientific Visualization Synthesizer, Visualization 1991 Proceedings, IEEE Conference on San Diego CA, USA, Oct. 22, 1992, pp. 262-267.

First Examination Report, EP 08 705 705.5-2218, European Patent Office, Sep. 12, 2009, 6 pages.

Ching-Rong Lin and R. Bowen Loftin; VR User Interface: Closed World Interaction; Proceedings of the ACM Symposium on Virtual Reality Software and Technology; 2000; pp. 153-159; ACM; New York, New York.

Ching-Rong Lin, R. Bowen Loftin and H. Roice Nelson, Jr.; Interaction With Geoscience Data in an Immersive Environment; Virtual Reality; 2000; pp. 55-62.

Ching-Rong Lin and R. Bowen Loftin; Application of Virtual Reality in the Interpretation of Geoscience Data; Proceedings of the ACM Symposium on Virtual Reality Software and Technology; 1998; pp. 187-194; ACM; New York, New York.

Texaco E&P Center Allows Visual Probe of 3D Data Volumes; Jun. 1, 1998, pp. 46-47 (copied on one page); Oil & Gas Journal.

VoxelGeo; printed Mar. 27, 1998; 5 pages; Paradigm Geophysical Broadband Solutions in Depth; printed from CogniSeis website www.cogniseis.com/voxelgeo.html.

VoxelGeo Consortium Meeting Summary; CogniSeis Development; Jun. 13, 1996; 2 pages.

Holden, Paul; VoxelGeo 1.1.1; Productivity Tool for the Geosciences; Release Notes (1994) & User's Guide (Rev. Mar. 1994); Vital Images, Inc., pp. 1-461.

Does Your 3D Interpretation Software Move as Fast as You Do? GeoProve Does Magic Earth Brochure, Sep. 1999, 2 pgs.

Masahiro Fujita et al. "Applying Per-Pixel Shading for Relief Texture Mapping", Report of Research of Information Processing Society of Japan, vol. 2002, No. 1 09, Nov. 22, 2002, 1 page [Abstract Only].

Cignoni, Montani, Scopigno, "MagicSphere: an insight tool for 3D data visualization," 1994, p. 317-328, vol. 13(3), Computer Graphics Forum,The Eurographics Association and Blackwell Publishing Ltd. Oxford, U.K.

Durkin, Hughes, "Nonpolygonal Isosurface Rendering for Large Volume Datasets", "Proceedings of the conference on Visualization '94", 1994, p. 293-300, IEEE Computer Society Press, Los Alamitos, CA, U.S.A.

Lorensen, Cline, "Marching Cubes: A High Resolution 3D Surface Construction Algorithm," Computer Graphics, vol. 21 issue 4, Jul. 1987, pp. 163-169, Association for Computing Machinery, New York, U.S.A.

Ney, Fishman, "Editing Tools for 3D Medical Imaging," IEEE Computer Graphics & Applications, Nov. 1991, pp. 63-71, vol. 11 issue 6, IEEE Computer Society Press, Los Alamitos, CA, U.S.A.

Lacroute, "Fast Volume Rendering Using a Shear-Warp Factorization of the Viewing Transformation", Doctoral dissertation submitted to Departments of Electrical Engineering and Computer Science Stanford University, Sep. 1995, 236 pgs., Stanford University Stanford, CA, USA.

Bajaj, et al., "Fast Isocontouring for Improved Interactivity", Proc. ACM SIGGRAPH/IEEE Symposium on Volume Visualization (ACM Press, 1996), pp. 39-46.

"Computing", Mechanical Engineering Magazine, Oct. 1996, 8 pgs., The American Society of Mechanical Engineers.

VoxelGeo User's Manual Release 2.1.5, Oct. 1996, 213 pages, Cogniseis Development, Inc., Houston, Texas.

IRIS Universe No. 36, Silicon Graphics Inc., Summer 1996, 96 pgs.

Dopkin, Duane & James, Huw "Trends in Visualization for E&P Operations" First Break; Mar. 2006; pp. 55-59; vol. 24 EAGE.

Lin, Jim Ching-Rong; "Geoscience Visualization with GPU Programming" SPEI Visualization and Data Analysis; 2005; pp. 26-234, Houston, TX.

Castanie, Lurent, Levy, Bruno, & Boquet, Fabian; "VolumeExplorer, Roaming Large Volumes to Couple Visualization and Data Processing for Oil & Gas Exploration" Oct. 23-28, 2005; pp. 247-254; Proceedings of the IEEE Visualization; Minneapolis MN.

Fernando, Randima and Kilgard, Mark J., CG Toolkit—User's Manual: A Developer's Guide to Programmable Graphics; Sep. 2005; 356 Pages; Release 1/4; NVIDIA; Addison-Wesley.

Lum, Eric B., Wilson, Brett & Ma, Kwan Liu; "High Quality Lighting and Efficient Pre-Integration for Volume Rendering"; Joint Eurographics—IEEE TCVG Symposium on Visualization/TheEurographics Association; 2004; 11 pages.

Castanie, Laurent, Bosquet, Fabien & Levy, Bruno; "Advances in Seismic Interpretation Using new Volume Visualization Techniques" First Break (Special Topic-Reservoir Geoscience/Engineering) Oct. 2005; pp. 69-72; vol. 23 EAGE.

Lin, Ching-Rong, Loftin, R. Bowen & Stark, Tracy: Virtual Reality for Geosciences Visualization: Computer Human Interaction; 1998; Proceedings, 3rd Asia Pacific Shonan Village Center; Japan; Jul. 15-17, 1998; pp. 196-201; IEEE Comput. Soc. US, Las Alamitos, CA.

Pommert, Andreas, Hohne, Karl Heinz, Pflesser, Bernhard, Riemer, Martin, Schiemann, Thomas, Schubert, Rainer, Tiede, Ulf & Schumacher, Udo; A Highly Realistic Volume Model Derived From the Visible Human Male; The Third Visible Human Project Conference, Bethesda, Maryland; Oct. 2000; 11 pages.

Oldenzeil, T.; Dithuijzen, Roos Van & Kruijsdijk, Cor Van; Geologic Parameterization of Reservoir Model Enhances History-Match Procedure; The Leading Edge; Jun. 2002; pp. 544-551; vol. 21, No. 6.

Schwab, Matthias; Enhancement of Discontinuities in Seismic 3-D Images Using a Java Estimation Library; Ph.D Thesis/Stanford University/Department of Geophysics, Jun. 2001; 164 Pages.

Cortesi, "REACT Real Time Programmer's Guide", Mar. 18, 1997, 187 pages, Silicon Graphics Inc., California, U.S.A.

Cogniseis, "VoxelGeo version 2.2 Product Definition version 14", 212 pgs., May 1996, Houston, Texas.

Cabral, et al., "Accelerated Volume Rendering and Tomographic Reconstruction Using Texture Mapping Hardware", 1995, p. 91-97, Association for Computing Machinery, New York, U.S.A.

Cullip Timothy and Neumann Ulrich, "Accelerating Volume Reconstruction with 3D Texture Hardware", 1993, 6 pages, University of North Carolina, Chapel Hill, U.S.A.

Cignoni, Montani, Scopigno, "MagicSphere: an insight tool for 3D data visualization," 1994, p. 317-328, vol. 13(3), Computer Graphics Forum, The Eurographics Association and Blackwell Publishing Ltd. Oxford, U.K.

Yagel Roni, "The Flipping Cube: A Device for Rotating 3D Rasters", "Advances in Computer Graphics Hardware (Machines)", 1991, p. 86-99.

(56) References Cited

OTHER PUBLICATIONS

Speray, Kennon, "Volume Probes: Interactive data Exploration on Arbitrary Grids" Computer Graphics, vol. 24 issue 5, Nov. 1990, pp. 5-12, Association for Computing Machinery, New York, U.S.A.

Höllerer, Hege, Stallings, "Visualization and 3D-Interaction for Hyperthermia Treatment Planning," 1995, 7 pgs., Proceedings, 9th International Symposium on Computer Assisted Radiology, CH Volume Visualization Workshop, Berlin, Germany.

Levoy Marc, "Design for a Real-Time High-Quality Volume Rendering Workstation", Proceedings of the Chapel Hill Workshop on Volume Visualization, 1989, p. 85-92, Association for Computing Machinery, New York, U.S.A.

Kanus, et al, "Implimentations of Cube-4 on the Teramac Custom Computing Machine", "Computers and Graphics", 1997, p. 199-208, vol. 21, Elsevier, London, U.K.

Kaufman, Bakalash "Memory and Processing Architecture for 3D Voxel-Based Imagery," "IEEE Computer Graphics and Applications", Nov.-Dec. 1988, pp. 10-23, vol. 08 No. 6, IEEE Computer Society, Washington D.C., U.S.A.

Brady, et al, "Crumbs: a virtual environment tracking tool for biological imaging," IEEE Symposium on Frontiers in Biomedical Visualization, 1995, p. 18, IEEE Computer Society, Washington DC, U.S.A.

Fraser Robert, "Interactive Volume Rendering Using Advanced Gaphics Architectures," 1994, 8 pages, Silicon Graphics Inc.

Kulic, "Building an OpenGL Volume Renderer" "SGI Development News", 1996, 9 pages.

Serra, et al., "Interactive Vessel Tracing in Volume Data", 1997, 131-137, "Symposium on 3D Grapics", Providence, RI.

Pfister, Kaufman, "Cube 4—A Scalable Architecture for Real-Time Volume Rendering," Proceedings 1996 IEEE Symposium on Volume Visualization, Oct. 28-29, 1996, pp. 47-54, 100.

James, Huw, Peloso, Andy and Wang, Joanne; Volume Interpretation of Multi-Attribute 3D Surveys; First Break; Mar. 2002, pp. 176-179; vol. 20:3; EAGE.

Christie, Murray; Thinking Inside the Box; CSEG Recorder; Jun. 2002; pp. 50-57.

Kilgard, Mark J., A Practical and Robust Bump-Mapping Technique for Today's GPU's, NVIDIA Corporation, Santa Clara, California, Jul. 5, 2000, pp. 1-39.

James D. Foley et al, Computer Graphics: Principles and Practice (2nd ed.), 1990, p. 838, Boston, Massachusetts, USA.

Holden, Paul, VoxelGeo 1.1.1: Productivity Tool for the Geosciences, Release Notes (1994) & User's Guide (Rev. Mar. 1994), Vital Images, Inc., pp. 1-461.

Goldman, J and T.M. Roy, "The Cosmic Worm," IEEE Computer Graphics and Applications, vol. 14, Issue 4, Jul. 1994, pp. 12-14.

Achenbach, S., et al., "Curved Multiplanar Reconstructions for the Evaluation of Contrast-Enhanced Electron Beam CT of the Coronary Arteries", American Journal of Roentgenology, Apr. 1998, pp. 895-899, vol. 170, No. 4, Baltimore, MD, US.

Lees, Jack, Constructing Faults from Seed Picks by Voxel Tracking, The Leading Edge, Mar. 1999, pp. 338, 340.

Yilmaz, Oz, and Lucas, Darran; Prestack Layer Replacement; Geophysics 51(7); Jul. 1986; pp. 1355-1369; vol. 51, No. 7; USA.

Tanner, M. Turhan, Ernest E. and Neidell, Norman S.; Paleo Seismic and Color Acoustic Impedence Sections; Applications of Downward Continuation in Structural and Stratigraphic Context; 1982; pp. 110-111; Expanded Abstract S8.7, 52nd Annual Meeting of the Society of Exploration Geophysicists; Dallas, Texas.

Sheriff, R.E.; Encyclopedic Dictionary of Applied Geophysics; http://scitation.aip.org/journals/doc/SEGLIB-home/segLogin.jsp; 2002; 1 page; 4th Ed.; Society of Exploration Geophysicists; Tulsa, Oklahoma.

Levin, Stewart A.; Resolution in Seismic Imaging: Is it all a Matter of Perspective?; Geophysics 63(2); Mar.-Apr. 1998; pp. 743-749; vol. 63, No. 2; USA.

Robler, Friedemann, Tejada, Eduadro, Fangmeier, Thomas, Ertl, Thomas, & Knauff, Markus; "GPU-Based Multi-Volume Rendering for the Visualization of Funtion Brain Images"; 14 pages, 2006.

Brown, Alistair R., "Interpretation of Three-Dimensional Seismic Data"; AAPG Memoir 42; Dec. 1999 pp. 19, 233, 5th Edition; American Association of Petroleum Geologists.

Mark, William R. Glanville, R. Steven, Akeley, Kurt, and Kilgard, Mark J.; Cg: A System for Programming Graphics Hardware in a C-like Language; Siggraph 2003;12 pgs.

Manssour, Isabel H., Furuie, Sergio S. Olabarriage, Silvia D., and Freitas, Carla M.D.S.; Visualizing Inner Structures in Multimodel Volume Data; XV Brazilian Symposium on Computer Graphics and Image Processing (SIBGRAPI'02); 2002; 8 pgs.

Cai, Wenli and Sakas, Georgios, Data Intermixing and Multi-Volume Rendering; Eurographics '99; 1999; 12 pgs; vol. 18, No. 3; Blackwell Publishers, Oxford, UK and Malden, MA.

Neider, Jackie, Davis, Tom, and Woo, Mason; OpenGL Programming Guide; 1994; pp. 422-427; 3rd Edition; Multitexturing; Silicon Graphics, Inc.; Addison-Wesley Professional.

Texaco E&P Center Allows Visual Probe of 3D Data Volumes, Oil & Gas Journal, Jun. 1, 1998, pp. 46-47, copied as one page.

Rost, R., The Open GL Shading Language, 2.1 Introduction to OpenGL Shading Language; 2.2 Why Write Shaders?; 2.3 OpenGL Programmable Processors; Chapter 2, pp. 33-36, Feb. 14, 2004.

Does Your 3D Interpretation Software Move As Fast As You Do? GeoProbe Does Magic Earth Brochure, Sep. 1999, 2 pgs.

VIP Software, 3D ViewUser's Guide, Data Visualization Techniques, pp. 75-140, Mar. 2001.

Yagel et al., Hardware Assisted Volume Rendering of Unstructured Grids by Incremental Slicing, pp. 1-11, 1996.

Article 34 Response, PCT/US08/50260, Jul. 31, 2008, 40 pages.

Elvins T.T., "A Survey of Algorithms for Volume Visualization" Computer Graphics, ACM, US, vol. 26, No. 3, Aug. 1, 1992, pp. 194-201.

Crawfis R,A. at al., A Scientific Visualization Synthesizer, Visualization 1991 Proceedings, IEEE Conference on San Diego CA, USA, Oct. 22, 1992, pp. 262-267.

First Examination Report, EP 08 705 705,5-2218, European Patent Office, Sep. 12, 2009, 6 pages.

* cited by examiner

SYSTEMS AND METHODS FOR IMAGING A VOLUME-OF-INTEREST

CROSS REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention generally relates to systems and methods for imaging a volume-of-interest, which include an object or point of interest to be analyzed in a display of three-dimensional data.

BACKGROUND OF THE INVENTION

In some fields, it is useful to model objects in two or three dimensions. Modeling such objects proves useful in a variety of applications. For example, modeling the subsurface structure of a portion of the earth's crust is useful for finding oil deposits, locating fault lines and in other geological applications. Similarly, modeling human body parts is useful for medical training exercises, diagnoses, performing remote surgery or for other medical applications. The foregoing objects are exemplary only, and other fields may likewise find utility in modeling objects.

In the field of earth sciences, seismic sounding is used for exploring the subterranean geology of an earth formation. An underground explosion excites seismic waves, similar to low-frequency sound waves that travel below the surface of the earth and are detected by seismographs. The seismographs record the time of arrival of seismic waves, both direct and reflected. Knowing the time and place of the explosion, the time of travel of the waves through the interior can be calculated and used to measure the velocity of the waves in the interior. A similar technique can be used for offshore oil and gas exploration. In offshore exploration, a ship tows a sound source and underwater hydrophones. Low frequency, (e.g., 50 Hz) sound waves are generated by, for example, a pneumatic device that works like a balloon burst. The sounds bounce off rock layers below the sea floor and are picked up by the hydrophones. In either application, subsurface sedimentary structures that trap oil, such as faults and domes are mapped by the reflective waves.

In the medical field, a computerized axial topography (CAT) scanner or magnetic resonance imaging (MRI) device is used to collect information from inside some specific area of a person's body. Such modeling can be used to explore various attributes within an area of interest (for example, pressure or temperature).

The data is collected and processed to produce three-dimensional volume data sets. A three-dimensional volume data set, for example, may be made up of "voxels" or volume elements, whereby each voxel may be identified by the x, y, z coordinates of one of its eight corners or its center. Each voxel also represents a numeric data value (attribute) associated with some measured or calculated physical property at a particular location. Examples of geological seismic data values include amplitude, phase, frequency, and semblance. Different data values are stored in different three-dimensional volume data sets, wherein each three-dimensional volume data set represents a different data value.

Graphical displays allow for the visualization of vast amounts of data, such as three-dimensional volume data, in a graphical representation. However, displays of large quantities of data may create a cluttered image or an image in which a particular object or point of interest is partially obscured by undesirable data objects. There is therefore, a need to restrict the data displayed to a volume containing the object or point of interest.

One conventional solution requires the selective deletion of particular objects that are blocking the view of an object or point of interest or cluttering the display of the data. There are disadvantages associated with this solution, which include significant time consumption and the required deletion of an entire object instead of just that portion of the object that is outside the volume-of-interest. A more efficient and selective technique is needed, which will allow the selective removal of all undesirable objects, or portions thereof, outside the display of a particular volume-of-interest without having to individually select and remove each displayed object in its entirety.

Another approach is described in U.S. Pat. No. 6,765,570, which is assigned to Landmark Graphics Corporation and incorporated herein by reference (the "570 patent"). This patent describes a system and method for analyzing and imaging three-dimensional volume data sets using a three-dimensional sampling probe. The sampling probe can be created, shaped, and moved interactively by the user within a three-dimensional volume data set. As the sampling probe changes shape, size or location in response to user input, an image representing an intersection of the sampling probe and the three-dimensional volume data set is re-drawn at a rate sufficiently fast to be perceived in real-time by the user. In this manner, the user can achieve real-time interactivity by limiting the display of the three-dimensional volume data set to an image of an intersection of the sampling probe and the three-dimensional volume data set.

Although the '570 patent describes a method for limiting the display of a three-dimensional data set, the sampling probe is created in a default shape, size and location upon instantiation. As a result, the sampling probe must be manipulated to surround only an object or point of interest. The sampling probe, upon instantiation, may therefore, often include extraneous information or an image of only part of the object or point of interest. Manipulation of the probe shape, size and location to achieve a desired volume-of-interest containing the object or point of interest necessarily entails additional time consumption, which leads to inefficiency in producing a clear image of the object or point of interest. Further, the '570 patent fails to describe or disclose how to move an object or point of interest within the three-dimensional volume data set while it is surrounded by the sampling probe.

As such, there is a need for automatically imaging a volume-of-interest comprising an object or point of interest in a display of three-dimensional data, by reducing extraneous three-dimensional data in the display rather than adjusting the volume-of-interest. Further, there is a need for maintaining a volume-of-interest relative to the object or point of interest if the object or point of interest needs to be moved.

SUMMARY OF THE INVENTION

The present invention therefore, meets the above needs and overcomes one or more deficiencies in the prior art by providing systems and methods for automatically imaging a volume-of-interest, which may comprise an object or point of interest to be analyzed in a display of three-dimensional data and may be maintained relative to the object or point of interest as the object or point of interest is moved.

In one embodiment, the present invention includes a method for imaging a volume-of-interest comprising: i) selecting an object or point of interest from a display of three-dimensional data; ii) positioning a bounding box around the object or point of interest using a computer processor, the bounding box surrounding only the object or point of interest and a predetermined margin upon instantiation; and iii) displaying an image of only the contents of the bounding box upon instantiation of the bounding box, the displayed image representing the volume-of-interest and initially comprising the object or point of interest.

In another embodiment, the present invention includes a non-transitory computer-readable medium tangibly carrying computer executable instructions for performing a method to image a volume-of-interest, the instructions being executable to implement: i) selecting an object or point of interest from a display of three-dimensional data; ii) positioning a bounding box around the object or point of interest, the bounding box surrounding only the object or point of interest and a predetermined margin upon instantiation; and iii) displaying an image of only the contents of the bounding box upon instantiation of the bounding box, the displayed image representing the volume-of-interest and initially comprising the object or point of interest.

In yet another embodiment, the present invention includes a non-transitory computer-readable medium tangibly carrying computer executable instructions for imaging a volume-of-interest comprising: i) a user input module for accepting user inputs related to selecting an object or point of interest from a display of three-dimensional data; ii) a volume-of-interest module for processing a set of instructions to position a bounding box around the object or point of interest upon instantiation of the bounding box, the bounding box surrounding only the object or point of interest and a predetermined margin upon instantiation; and iii) a rendering module for displaying an image of only the contents of the bounding box, the displayed image representing the volume-of-interest and initially comprising the object or point of interest.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The invention will be described with reference to the accompanying drawings, in which like elements are referenced with like reference numerals, and in which.

DETAILED DESCRIPTION OF THE PREFERRED EMBODIMENTS

The subject matter of the present invention is described with reference to certain preferred embodiments however, is not intended to limit the scope of the invention. The claimed subject matter thus, might also be embodied in other ways to include different steps, or combinations of steps, similar to the ones described herein and other technologies. Although the term "step" may be used herein to connote different elements of methods employed, the term should not be interpreted as implying any particular order among or between various steps herein disclosed unless and except when the order of individual steps is explicitly described.

In one embodiment, the present invention may be described in the general context of a computer-executable program of instructions, such as program modules, generally referred to as software. The software may include, for example, routines, programs, objects, components, data structures, etc., that perform particular tasks or implement particular abstract data types. The software forms an interface to allow a computer to react according to a source of input. The software may also cooperate with other code segments to initiate a variety of tasks in response to data received in conjunction with the source of the received data. The software may be stored onto any variety of memory media such as CD-ROM, magnetic disk, bubble memory and semiconductor memory (e.g., various types of RAM or ROM). Furthermore, the software and results may be transmitted over a variety of carrier media such as optical fiber, metallic wire, free space and/or through any of a variety of networks such as the internet.

Those skilled in the art will appreciate that the present invention may be implemented in a variety of computer-system configurations including hand-held devices, multi-processor systems, microprocessor-based or programmable-consumer electronics, minicomputers, mainframe computers and the like. Any number of computer-systems and computer networks are therefore, acceptable for use with the present invention. The present invention may be practiced in distributed-computing environments where tasks are performed by remote-processing devices that are linked through a communications network. In a distributed-computing environment, the software may be located in both local and remote computer-storage media including memory storage devices.

Figure 1:
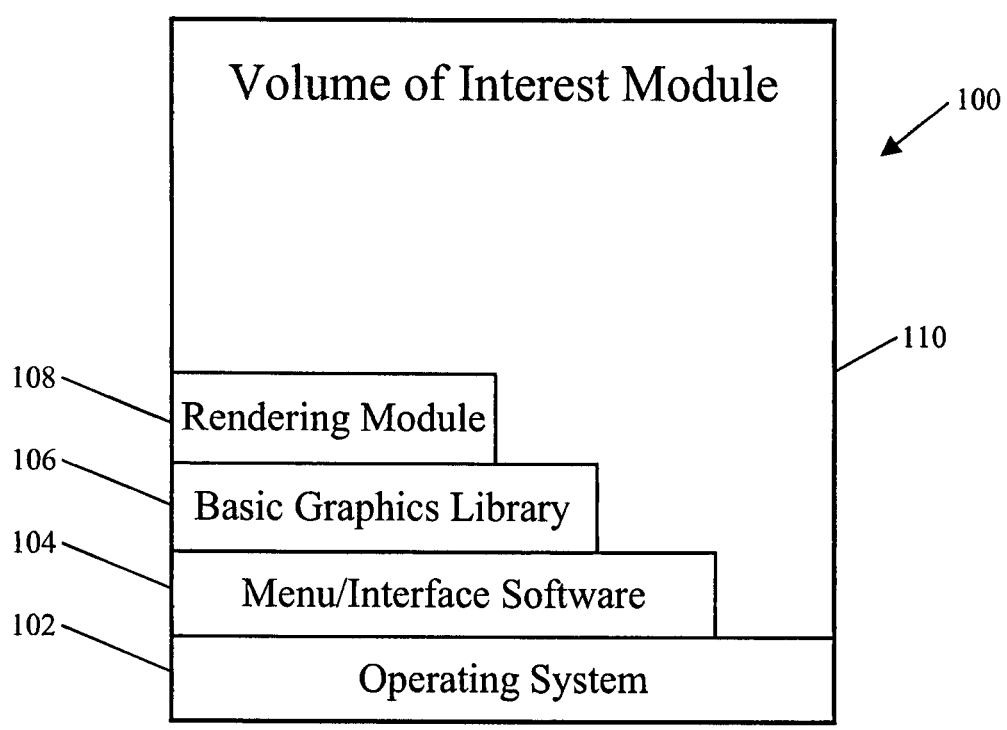
FIG. 1 is a block diagram illustrating one embodiment of a software program for implementing the present invention.

The present invention may therefore, be implemented using hardware, software or a combination thereof, in a computer system or other processing system. FIG. 1 is a block diagram illustrating one embodiment of a software program 100 for the present invention. At the base of the program 100 is an operating system 102. A suitable operating system 102 may include, for example, a Windows® operating system from Microsoft Corporation, or other operating systems as would be apparent to one of skill in the relevant art.

Menu/interface software 104 overlays the operating system 102. The menu/interface software 104 are used to provide various menus and windows to facilitate interaction with the user, and to obtain user input and instructions. As would be readily apparent to one of skill in the relevant art, any number of menu/interface software programs could be used in conjunction with the present invention.

A basic graphics library 106 overlays menu/interface software 104. Basic graphics library 106 is an application programming interface (API) for three-dimensional computer graphics. The functions performed by basic graphics library 106 may include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes and accumulation buffer.

A particularly useful basic graphics library 106 is OpenGL®, marketed by Silicon Graphics, Inc. ("SGI®"). The OpenGL® API is a multi-platform industry standard that is hardware, window and operating system independent. OpenGL® is designed to be callable from C, C++, FORTRAN, Ada and Java programming languages. OpenGL® performs each of the functions listed above for basic graphics library 106. Some commands in OpenGL® specify geometric objects to be drawn, and others control how the objects are handled. All elements of the OpenGL® state, even the contents of the texture memory and the frame buffer, can be obtained by a client application using OpenGL®. OpenGL® and the client application may operate on the same or different machines because OpenGL® is network transparent. OpenGL® is described in more detail in the OpenGL® Programming Guide (ISBN: 0-201-63274-8) and the OpenGL® Reference Manual (ISBN: 0-201-63276-4), both of which are incorporated herein by reference.

A rendering module 108 overlays basic graphics library 106. The rendering module 108 is an API for creating real-time, multi-processed three-dimensional visual simulation graphics applications. As will be understood by those skilled in the art, the rendering module 108 may include a suite of tools for two-dimensional and/or three-dimensional seismic data interpretations including, for example, interactive horizon and fault management, three-dimensional visualization and attribute analysis. The rendering module 108 therefore, provides functions that bundle together graphics library state control functions such as lighting, materials, texture, and transparency. These functions track state and the creation of display lists that can be rendered later. AssetView™, which is a commercial-software package marketed by Landmark Graphics Corporation for use in the oil and gas industry, is one example of an appropriate rendering module for use with the present invention.

Another example of an appropriate rendering module is OpenGL Performer®, which is available from SGI®. OpenGL Performer® supports the OpenGL® graphics library discussed above. OpenGL Performer® includes two main libraries (libpf and libpr) and four associated libraries (libpfdu, libpfdb, libpfui and libpfutil).

The basis of OpenGL Performer® is the performance rendering library libpr, a low-level library providing high speed rendering functions based on GeoSets and graphics state control using GeoStates. GeoSets are collections of drawable geometry that group same-type graphics primitives (e.g., triangles or quads) into one data object. The GeoSet contains no geometry itself, only pointers to data arrays and index arrays. Because all the primitives in a GeoSet are of the same type and have the same attributes, rendering of most databases is performed at maximum hardware speed. GeoStates provide graphics state definitions (e.g., texture or material) for GeoSets.

Layered above libpr is libpf a real-time visual simulation environment providing a high-performance multi-process database rendering system that optimizes use of multiprocessing hardware. The database utility library, libpfdu, provides functions for defining both geometric and appearance attributes of three-dimensional objects, shares state and materials, and generates triangle strips from independent polygonal input. The database library libpfdb uses the facilities of libpfdu, libpf and libpr to import database files in a number of industry standard database formats. The libpfui is a user interface library that provides building blocks for writing manipulation components for user interfaces (C and C++ programming languages). Finally, the libpfutil is the utility library that provides routines for implementing tasks and graphical user interface (GUI) tools.

An application program which uses OpenGL Performer® and OpenGL® API typically performs the following steps in preparing for real-time three-dimensional visual simulation:
  1. Initialize OpenGL Performer®;
  2. Specify number of graphics pipelines, choose the multiprocessing configuration, and specify hardware mode as needed;
  3. Initialize chosen multiprocessing mode;
  4. Initialize frame rate and set frame-extend policy;
  5. Create, configure, and open windows as required; and
  6. Create and configure display channels as required.

Once the application program has created a graphical rendering environment by carrying out steps 1 through 6 above, then the application program typically iterates through the following main simulation loop once per frame:
  7. Compute dynamics, update model matrices, etc.;
  8. Delay until the next frame time;
  9. Perform latency critical viewpoint updates; and
  10. Draw a frame.

Alternatively, Open Scene Graph® may be used as another example of an appropriate rendering module. Open Scene Graph® operates in the same manner as OpenGL Performer®, providing programming tools written in C/C++ for a large variety of computer platforms. Open Scene Graph® is based on OpenGL® and is publicly available.

Overlaying the other elements of program 100 is volume-of-interest module 110. The volume-of-interest module 110 is configured to interact with three-dimensional data sets representing predetermined objects such as, for example, horizons and faults or three-dimensional point sets. In a manner generally well known in the art, the volume-of-interest module 110 interfaces with, and utilizes the functions carried out by, the rendering module 108, the basic graphics library 106, the menu/interface software 104 and the operating system 102. The volume-of-interest module 110 may be written in an object oriented programming language such as, for example, C++ to allow the creation and use of objects and object functionality. Methods enabled by the volume-of-interest module 110 are further described in reference to FIGS. 2 through 6.

The program 100 illustrated in FIG. 1 may be executed or implemented through the use of a computer system incorporating the program 100 and various hardware components. The system hardware components may include, for example, a processor, memory (e.g., random access memory and/or non-volatile memory devices), one or more input devices, one or more display devices, and one or more interface devices. These hardware components may be interconnected according to a variety of configurations and may include graphics cards like GeForce® marketed by NVIDIA® and processors manufactured by Intel® and/or AMD®. Non-volatile memory devices may include, for example, devices such as tape drives, semiconductor ROM or EEPROM. Input devices may include, for example, devices such as a keyboard, a mouse, a digitizing pad, a track ball, a touch-sensitive pad and/or a light pen. Display devices may include, for example, devices such as monitors, projectors and/or head-mounted displays. Interface devices may be configured to require digital image data from one or more acquisition devices and/or from one or more remote computers or storage devices through a network.

Any variety of acquisition devices may be used depending on the type of object being imaged. The acquisition device(s) may sense various forms of mechanical energy (e.g., acoustic energy, displacement and/or stress/strain) and/or electromagnetic energy (e.g., light energy, radio wave energy, current and/or voltage).

A processor may be configured to reprogram instructions and/or data from RAM and/or non-volatile memory devices, and to store computational results into RAM and/or non-volatile memory devices. The computer-executable instructions direct the processor to operate on three-dimensional data sets and/or three-dimensional point sets based on the methods described herein.

In one embodiment, a three-dimensional volume data set may be stored in a format generally well known in the art. For example, the format for a particular data volume may include two parts: a volume header followed by the body of data that is as long as the size of the data set. The volume header typically includes information in a prescribed sequence, such as the file path (location) of the data set, size, dimensions in the x, y, and z directions, annotations for the x, y, and z axes, annotations for the data value, etc. The body of data is a binary sequence of bytes and may include one or more bytes per data value. For example, the first byte is the data value at volume location (0,0,0); the second byte is the data value at volume location (1,0,0); and the third byte is the data value at volume location (2,0,0). When the x dimension is exhausted, then the y dimension and the z dimension are incremented, respectively. This embodiment, however, is not limited in any way to a particular data format or data volume.

When a plurality of data volumes is used, the data value for each of the plurality of data volumes may represent a different physical parameter or attribute for the same geographic space. By way of example, a plurality of data volumes could include a geology volume, a temperature volume and a water-saturation volume. The voxels in the geology volume can be expressed in the form (x, y, z, seismic amplitude). The voxels in the temperature volume can be expressed in the form (x, y, z, ° C.). The voxels in the water-saturation volume can be expressed in the form (x, y, z, % saturation). The physical or geographic space defined by the voxels in each of these volumes is the same. However, for any specific spatial location $(x_0, y_0, z_0)$, the seismic amplitude would be contained in the geology volume, the temperature in the temperature volume and the water-saturation in the water-saturation volume.

The input data may be provided to the computer system through a variety of mechanisms. For example, the input data may be acquired into non-volatile memory and/or RAM using one or more interface devices. As another example, the input data may be supplied to the computer system through a memory medium such as a disk or a tape, which is loaded into/onto one of the non-volatile memory devices. In this case, the input data will have been previously recorded onto the memory medium. It is noted that the input data may not necessarily be raw sensor data obtained by an acquisition device. For example, the input data may be the result of one or more processing operations using a set of raw sensor data. The processing operation(s) may be performed by the computer system and/or one or more other computers.

Figure 2:
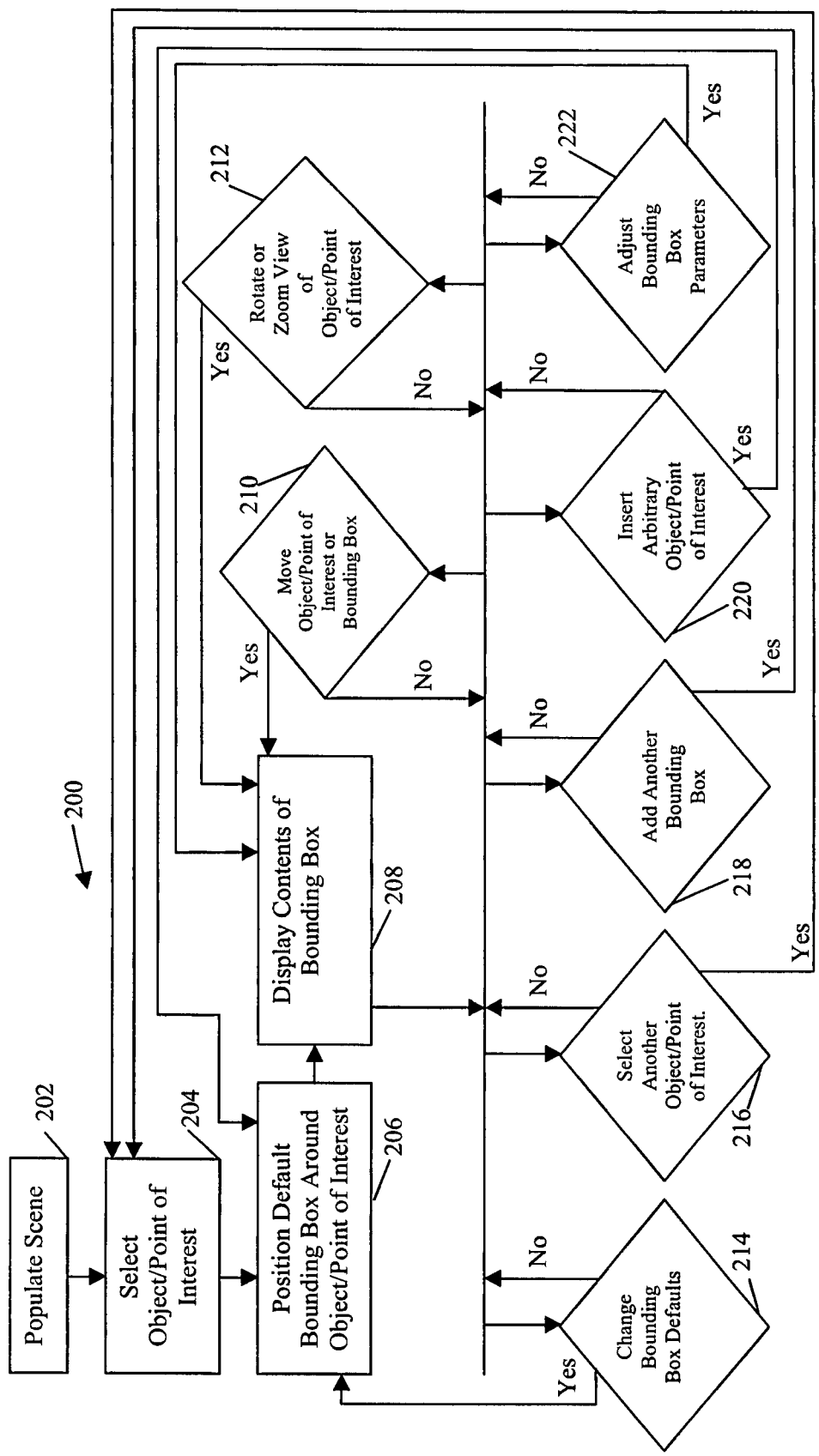
FIG. 2 is a flow diagram illustrating one embodiment of a method for implementing the present invention.

Referring now to FIG. 2, a method 200 for imaging a volume-of-interest is illustrated in the form of a flow diagram.

In step 202, one or more three-dimensional volume data sets are selected from available data sets using the GUI tools and menu/interface software 104 described in reference to FIG. 1. The selected data set(s) may then be displayed for interpretation and/or analysis using techniques generally well known in the art and/or described in the '570 patent. For example, voxel data is read from memory and converted into a specified color representing a specific texture. Textures are tiled into 254 pixel by 256 pixel images. This process is commonly referred to as sampling by those skilled in the art and may be coordinated among multiple CPU's on a per-tile basis. The process of interpreting the data often results in the display of one or more objects or points of interest, which are used to populate the scene or display in step 202.

Figure 3:
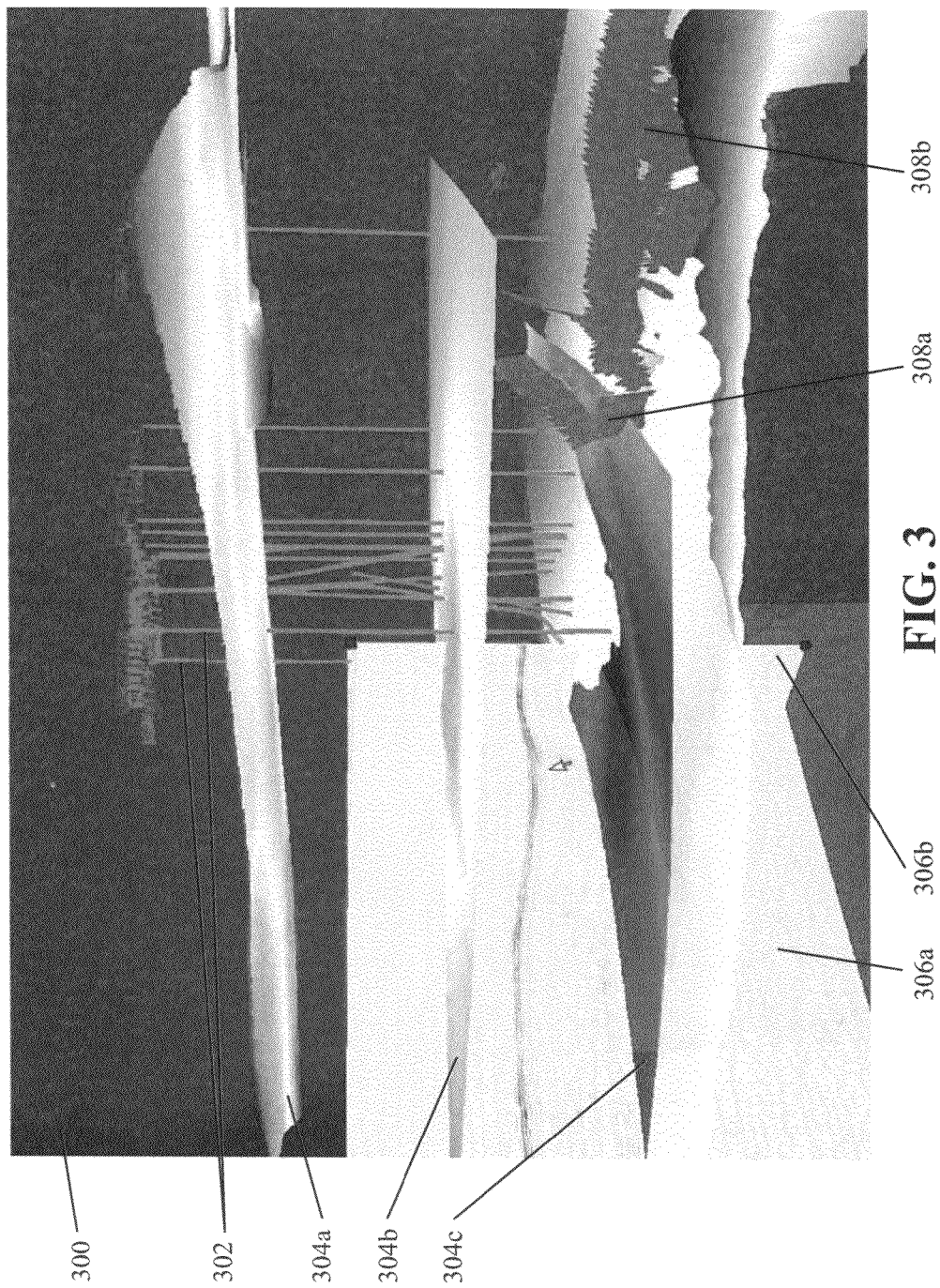
FIG. 3 is a color drawing illustrating a display of three-dimensional seismic data and multiple objects comprising well paths and interpretations of the three-dimensional seismic data.

FIG. 3 is an exemplary display 300 of a populated scene using one or more three-dimensional volume data sets. The display 300 includes seismic data in the form of various objects such as well paths 302, horizons 304a, 304b 304c, seismic slices 306a, 306b and faults 308a, 308b. It is noteworthy that, among other things, the seismic slice 306b partially blocks the view of the well paths 302, making the relative locations of the well paths 302 difficult to discern. A point may be defined by a specific point (e.g. x, y and z) within the display 300.

In step 204, an object or point of interest is selected from the display 300 for further analysis using the GUI tools and menu/interface software 104 described in reference to FIG. 1. An object or point of interest could be selected, for example, based on its spatial relationship with another object or point of interest. An object or point of interest may also be predefined using other criteria to allow selection of objects or points of interest that do not share a single defining characteristic with another object or point of interest in the display 300, for example.

In order to more fully analyze an object or point of interest and its immediate surroundings, a bounding box may be positioned around the object or point of interest in step 206. In one embodiment, after an object or point of interest is selected from the display 300, the bounding box automatically surrounds the object or point of interest upon instantiation, which is centered, using a default setting, in the bounding box. The bounding box defaults may be adjusted using the GUI tools and menu/interface software 104 described in reference to FIG. 1, such as a keyboard or mouse. The data inside of the bounding box remains visible upon its instantiation and as the bonding box moves. The bounding box therefore, isolates a volume-of-interest initially surrounding each selected object or point of interest for display and analysis.

The bounding box may be implemented using various techniques generally well known in the art and may include, for example, clipping planes that essentially 'clip' or remove the seismic data displayed outside of the bounding box. One technique, for example, is described in U.S. Pat. No. 7,170,530, which is incorporated herein by reference. Another technique is described in U.S. Pat. No. 7,218,331, which is also incorporated herein by reference. Other techniques are described in "VR User Interface: Closed World Interaction" by Ching-Rong Lin and R. Bowen Loftin and "Interaction with Geoscience Data in an Immersive Environment" by Ching-Rong Lin, R. Bowen Loftin and H. Roice Nelson, Jr., which are incorporated herein by reference and include techniques for displaying an image of the contents of a bounding box as the bounding box is manipulated.

In step 206, the bounding box may be set, as a default, to initially surround the entire object or point of interest selected, or any portion thereof. The bounding box is automatically instantiated at the default position relative to the object or point of interest. Preferably, the bounding box default is set to a size that is just large enough to surround the entire object or point or interest and a predetermined margin, which enlarges the volume-of-interest as needed. The predetermined margin can be, for example, set as a specific value or set to be proportionate to the size of the bounding box. Because an object and a point of interest are typically different in shape and size, the bounding box may also be set to default to any shape and size most closely associated with the shape and size of the object or point of interest in order to automatically surround the entire object or point of interest and the predetermined margin. The bounding box therefore, may be set to default to a different shape and size for each object or point of interest. Alternatively, the bounding box may be set to default to any predetermined shape and size in order to enlarge or reduce the volume-of-interest for display.

In one embodiment, for example, a bounding box may be set to default to a rectangle for objects and a square for points, which may comprise six clipping planes—i.e., two planes located perpendicular to each axis (x, y and z). Each clipping plane in a parallel set (the two clipping planes perpendicular to the same axis) is located opposite the other clipping plane in each parallel set relative to the object or point of interest and is positioned at a default distance (the pre-determined margin) from the nearest object or point of interest.

Figure 4:
FIG. 4 is a color drawing illustrating a volume-of-interest comprising a horizon from FIG. 3 as an object of interest and a portion of the three-dimensional seismic data and remaining objects from FIG. 3 surrounding the horizon.

In step 208, the contents of the bounding box are displayed for analysis. In this manner, the volume-of-interest, including the object or point of interest, may be displayed without extraneous data as illustrated in FIG. 4, for example. The display may also include other graphical features useful for user interface such as, for example, a compass to allow for directional determinations or estimations.

In FIG. 4, a volume-of-interest 400 is displayed and includes a bounding box (not visible) positioned around an object of interest, which is the horizon 304*c*, and a portion of the seismic data and remaining objects in FIG. 3 surrounding the horizon 304*c*. The spatial relationship between the faults 308*a*, 308*b* and the horizon 304*c* is now visible due to the removal of extraneous data. The reduced clutter is particularly apparent when compared to the display 300 in FIG. 3. The bounding box and its contents may also be manipulated in various ways using the GUI tools and menu/interface software 104 to adjust the view of the horizon 304*e* and the surrounding data in the volume-of-interest 400.

As the image is displayed in step 208, several options described in reference to steps 210 through 222 may be interactively controlled through the GUI tools and menu/interface software 104 to reduce the amount of extraneous three-dimensional data and analyze selected objects or points of interest within the display of a volume-of-interest.

In step 210, the object or point of interest may be interactively moved using the GUI tools and menu/interface software 104 relative to the display 300, for example. As the object or point of interest moves, the bounding box surrounds the object or point of interest and the predetermined margin. As a result, an image of only the contents of the bounding box is displayed, which includes the object or point of interest. This technique may be used to interactively move an object, like a well path, due to an interpretation error and display the contents of the bounding box as the object is being moved to a more appropriate location. Alternatively, the bounding box may be interactively moved in order to view other objects or points of interest as they fall within the parameters of the bounding box. In either case, only an image of the contents of the bounding box is displayed as the bounding box moves—which may or may not include an object or point of interest. Accordingly, step 208 may be repeated to provide a new display of an image of the bounding box contents as the bounding box and/or the object or point of interest move.

In step 212, the displayed image representing the volume-of-interest may be interactively manipulated (rotated or zoomed (in/out)) using the GUI tools and menu/interface software 104 to view a different perspective of the object or point of interest and the surrounding data as demonstrated by the volume-of-interest 400 in FIG. 4, which has been rotated (clockwise) and tilted when the horizon 304*c* is compared in FIGS. 3 and 4. As the volume-of-interest is rotated or zoomed, an image of only the contents of the bounding box is displayed. Accordingly, step 208 may be repeated to provide a different perspective of the volume-of-interest.

In step 214, another default shape and size for the bounding box may be determined using the GUI tools and menu/interface software 104 based on, for example, the shape or size of an object or point of interest selected. Accordingly, step 206 may be repeated to provide for auto-instantiation of the bounding box according to the newly determined default settings.

In step 216, a new object or point of interest may be interactively selected in the manner described in step 204 for analysis. In this step, a previously selected object or point of interest may be automatically removed and replaced with the new object or point of interest at the same time as the new object or point of interest is selected. Accordingly, step 204 may be repeated to provide for the selection of a new object or point of interest.

In step 218, another bounding box may be utilized to position around another object or point of interest interactively selected from the scene in the manner described in step 204 to display another volume-of-interest. In this step, a current volume-of-interest containing a previously selected object or point of interest may be displayed with another volume-of-interest containing another selected object or point of interest. Data therefore, may be selectively and interactively displayed in multiple volumes-of-interest that may or may not intersect each other for expanding the displayed image of three-dimensional data. Accordingly, step 204 may be repeated to provide for the addition of another bounding box after selection of another object or point of interest.

Figure 5:
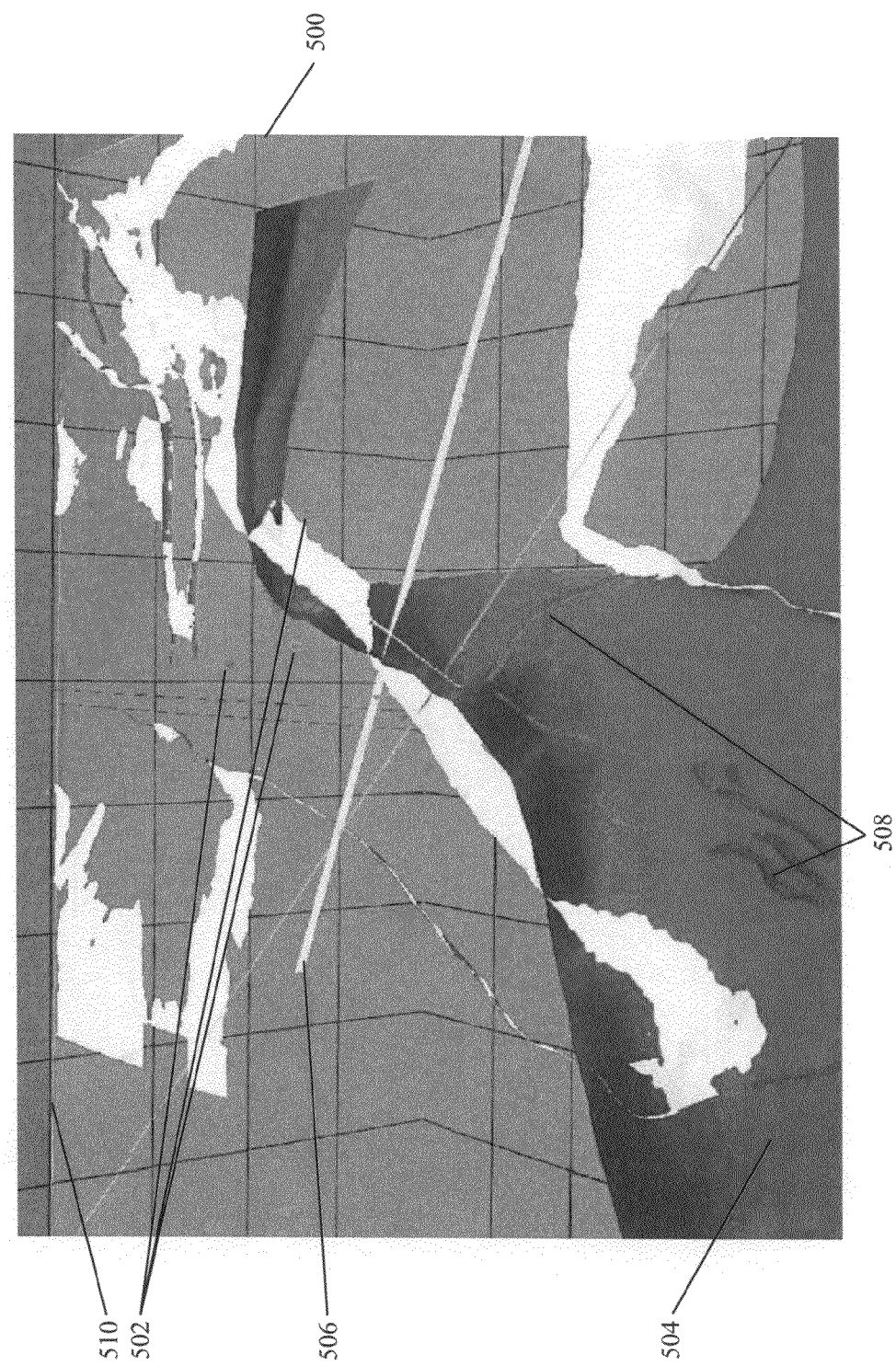
FIG. 5 is a color drawing illustrating another volume-of-interest comprising an arbitrary plane as an object of interest and a portion of the three-dimensional seismic data and remaining objects from FIG. 3 surrounding the arbitrary plane.

In step 220, an arbitrary object (two-dimensional or three-dimensional) or point of interest may be inserted into the scene using the GUI tools and menu/interface software 104. An arbitrary object may be opaque or translucent and may be introduced into any location within the scene as illustrated in FIG. 5, for example. In this step, a previously selected object or point interest may be automatically removed and replaced with the arbitrary object or point of interest at the same time as the arbitrary object or point of interest is inserted. Alternatively, a current volume-of-interest containing a previously selected object or point of interest may be displayed with another volume-of-interest containing the arbitrary object or point of interest. Accordingly, step 206 may be repeated.

In FIG. 5, a volume-of-interest 500 is displayed and includes a bounding box (not visible) positioned around an arbitrary object of interest, which is a translucent plane 510, and a portion of the three-dimensional seismic data and remaining objects in FIG. 3 surrounding the arbitrary plane 510. The spatial relationship of the well paths 502, the horizon 504 and the faults 508 is now apparent due to the removal of extraneous data and the insertion of the translucent plane 510. The bounding box and its contents may also be manipulated in various ways to adjust the view of the translucent plane 510 and its surroundings in the volume-of-interest 500. In this manner, the preferred image of any volume-of-interest can be managed by selectively inserting an arbitrary object or point of interest into a scene for analysis of other objects that appear in the contents of the bounding box but may not be desirable selections for instantiating the bounding box. Further, the arbitrary object or point of interest may be optionally moved or viewed in the manner described in reference to steps 210 and 212.

In step 222, the bounding box parameters, such as the default shape and size of the bounding box, may be interactively adjusted using the GUI tools and menu/interface software 104 to reduce or enlarge the volume-of-interest, as desired, for analysis. Accordingly, step 208 may be repeated to provide for a new display of an image of only the bounding box contents according to the new bounding box parameters.

Figure 6:
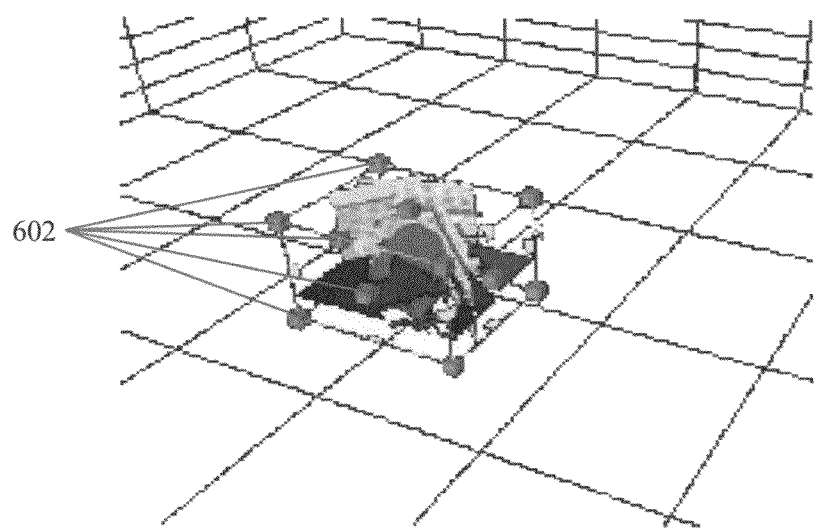
FIG. 6 is a color drawing illustrating a bounding box and the contents of the bounding box representing a volume-of-interest.

In another embodiment illustrated in FIG. 6, the bounding box is visible as a frame, which may include opaque edges with control tabs 602 located on each corner, along each edge and along each face of the bounding box. Control tabs 602 permit interactive manipulation of the bounding box as described in reference to steps 210-214 and 222. For example, the bounding box may be resized using the GUI tools and menu/interface software 104 to select a control tab 602 to change the shape and size of the bounding box. In all other respects, the bounding box operates in the same manner described in reference to FIG. 2.

Because the systems and methods described herein may be used to selectively and interactively analyze various objects or points of interest in a volume-of-interest, they may be particularly useful for analyzing three-dimensional medical or geological data, however, may also find utility for analyzing and interpreting any other type of three-dimensional data.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for imaging a volume-of-interest comprising:
    selecting an object or point of interest from a display of three-dimensional data;
    positioning a bounding box around the object or point of interest using a computer processor, the bounding box surrounding only the object or point of interest and a predetermined margin upon instantiation; and
    displaying an image of only the contents of the bounding box upon instantiation of the bounding box, the displayed image representing the volume-of-interest and initially comprising the object or point of interest.

2. The method of claim 1, further comprising moving the object or point of interest.

3. The method of claim 2, wherein the bounding box surrounds the object or point of interest as the object or point of interest moves and an image of only the contents of the bounding box is displayed, the displayed image comprising the object or point of interest.

4. The method of claim 1, further comprising moving the bounding box.

5. The method of claim 4, wherein an image of only the contents of the bounding box is displayed as the bounding box moves.

6. The method of claim 1, further comprising manipulating the displayed image to view a different perspective of the object or point of interest.

7. The method of claim 6, wherein the displayed image is rotated.

8. The method of claim 1, further comprising determining a default shape and size for instantiation of the bounding box.

9. The method of claim 8, further comprising adjusting at least one of the default shape and size.

10. The method of claim 8, further comprising determining another default shape and size for instantiation of the bounding box.

11. The method of claim 1, further comprising:
    selecting another object or point of interest from the display of three-dimensional data;
    positioning one of the bounding box and another bounding box around the another object or point of interest, the one of the bounding box and the another bounding box surrounding only the another object or point of interest and the predetermined margin upon instantiation; and
    displaying an image of only the contents of the one of the bounding box and the another bounding box upon instantiation of the bounding box or the another bounding box, the displayed image representing another volume-of-interest and initially comprising the another object or point of interest.

12. The method of claim 1, further comprising:
    selecting an arbitrary object or point of interest;
    positioning one of the bounding box and another bounding box around the arbitrary object or point of interest, the one of the bounding box and another bounding box surrounding only the arbitrary object or point of interest and the predetermined margin upon instantiation; and
    displaying an image of only the contents of the one of the bounding box and the another bounding box upon instantiation of the bounding box or the another bounding box, the displayed image representing another volume-of-interest and initially comprising the arbitrary object or point of interest.

13. The method of claim 1, wherein the object or point of interest comprises one of a horizon, a well, a fault and a three-dimensional point.

14. The method of claim 13, wherein the contents of the bounding box comprise at least one of the horizon, the well, the fault and the three-dimensional point.

15. A non-transitory computer-readable medium tangibly carrying computer executable instructions for performing a method to image a volume-of-interest, the instructions being executable to implement:
    selecting an object or point of interest from a display of three-dimensional data;
    positioning a bounding box around the object or point of interest, the bounding box surrounding only the object or point of interest and a predetermined margin upon instantiation; and
    displaying an image of only the contents of the bounding box upon instantiation of the bounding box, the displayed image representing the volume-of-interest and initially comprising the object or point of interest.

16. The computer-readable medium of claim 15, further comprising moving the object or point of interest.

17. The computer-readable medium of claim 16, wherein the bounding box surrounds the object or point of interest as the object or point of interest moves and an image of only the contents of the bounding box is displayed, the image comprising the object or point of interest.

18. The computer-readable medium of claim 15, further comprising moving the bounding box.

19. The computer-readable medium of claim 18, wherein an image of only the contents of the bounding box is displayed as the bounding box moves.

20. The computer-readable medium of claim 15, further comprising manipulating the displayed image to view a different perspective of the object or point of interest.

21. The computer-readable medium of claim 20, wherein the displayed image is rotated.

22. The computer-readable medium of claim 15, further comprising determining a default shape and size for instantiation of the bounding box.

23. The computer-readable medium of claim 22, further comprising adjusting at least one of the default shape and size.

24. The computer-readable medium of claim 22, further comprising determining another default shape and size for instantiation of the bounding box.

25. The computer-readable medium of claim 15, further comprising:
   selecting another object or point of interest from the display of three-dimensional data;
   positioning one of the bounding box and another bounding box around the another object or point of interest, the one of the bounding box and the another bounding box surrounding only the another object or point of interest and the predetermined margin upon instantiation; and
   displaying an image of only the contents of the one of the bounding box and the another bounding box upon instantiation of the bounding box or the another bounding box, the displayed image representing another volume-of-interest and initially comprising the another object or point of interest.

26. The computer-readable medium of claim 15, further comprising:
   selecting an arbitrary object or point of interest;
   positioning one of the bounding box and another bounding box around the arbitrary object or point of interest, the one of the bounding box and another bounding box surrounding only the arbitrary object or point of interest and the predetermined margin upon instantiation; and
   displaying an image of only the contents of the one of the bounding box and the another bounding box upon instantiation of the bounding box or the another bounding box, the displayed image representing another volume-of-interest and initially comprising the arbitrary object or point of interest.

27. The computer-readable medium of claim 15, wherein the object or point of interest comprises one of a horizon, a well, a fault and a three-dimensional point.

28. The computer-readable medium of claim 27, wherein the contents of the bounding box comprise at least one of the horizon, the well, the fault and the three-dimensional point.

29. A non-transitory computer-readable medium tangibly carrying computer executable instructions for imaging a volume-of-interest comprising:
   a user input module for accepting user inputs related to selecting an object or point of interest from a display of three-dimensional data;
   a volume-of-interest module for processing a set of instructions to position a bounding box around the object or point of interest upon instantiation of the bounding box, the bounding box surrounding only the object or point of interest and a predetermined margin upon instantiation; and
   a rendering module for displaying an image of only the contents of the bounding box, the displayed image representing the volume-of-interest and initially comprising the object or point of interest.

30. The computer-readable medium of claim 29, wherein the user input module accepts inputs to move the object or point interest.

* * * * *